Feb. 11, 1930.  R. D. PIKE  1,746,904
METALLURGICAL FURNACE
Filed Sept. 3, 1927  3 Sheets-Sheet 1

INVENTOR.
Robert D. Pike.
BY
Townsend, Loftus & Attett
ATTORNEYS.

Feb. 11, 1930 R. D. PIKE 1,746,904
METALLURGICAL FURNACE
Filed Sept. 3, 1927   3 Sheets-Sheet 2
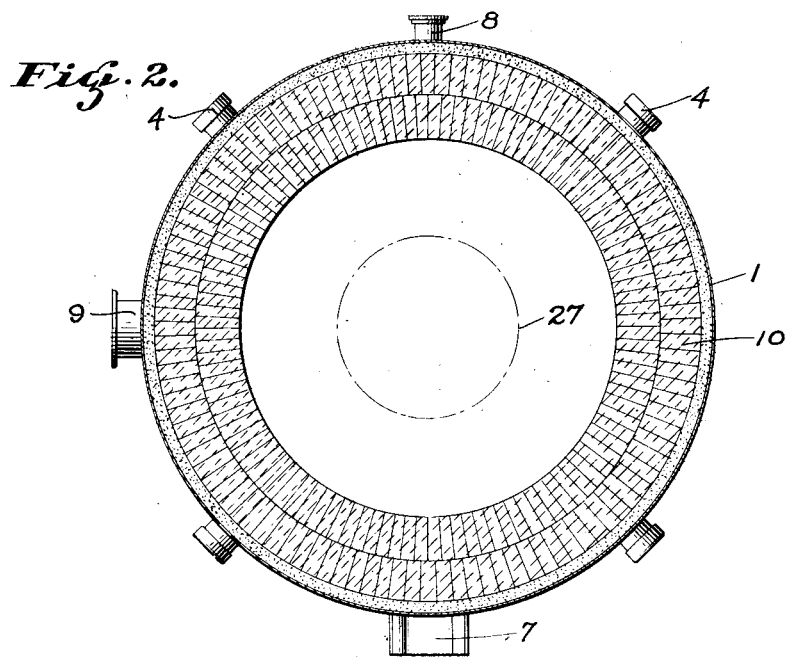
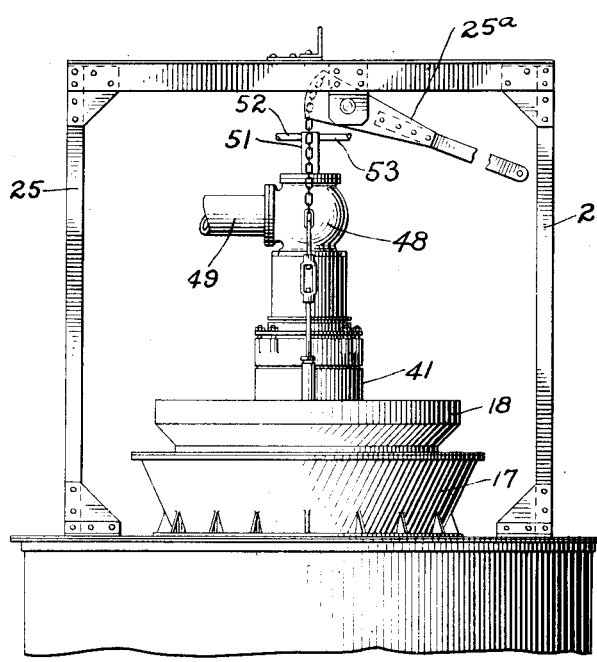
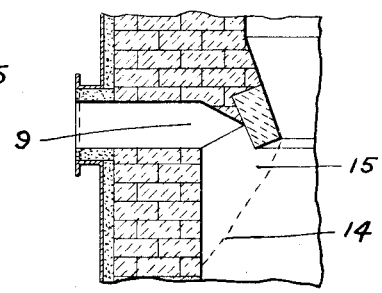

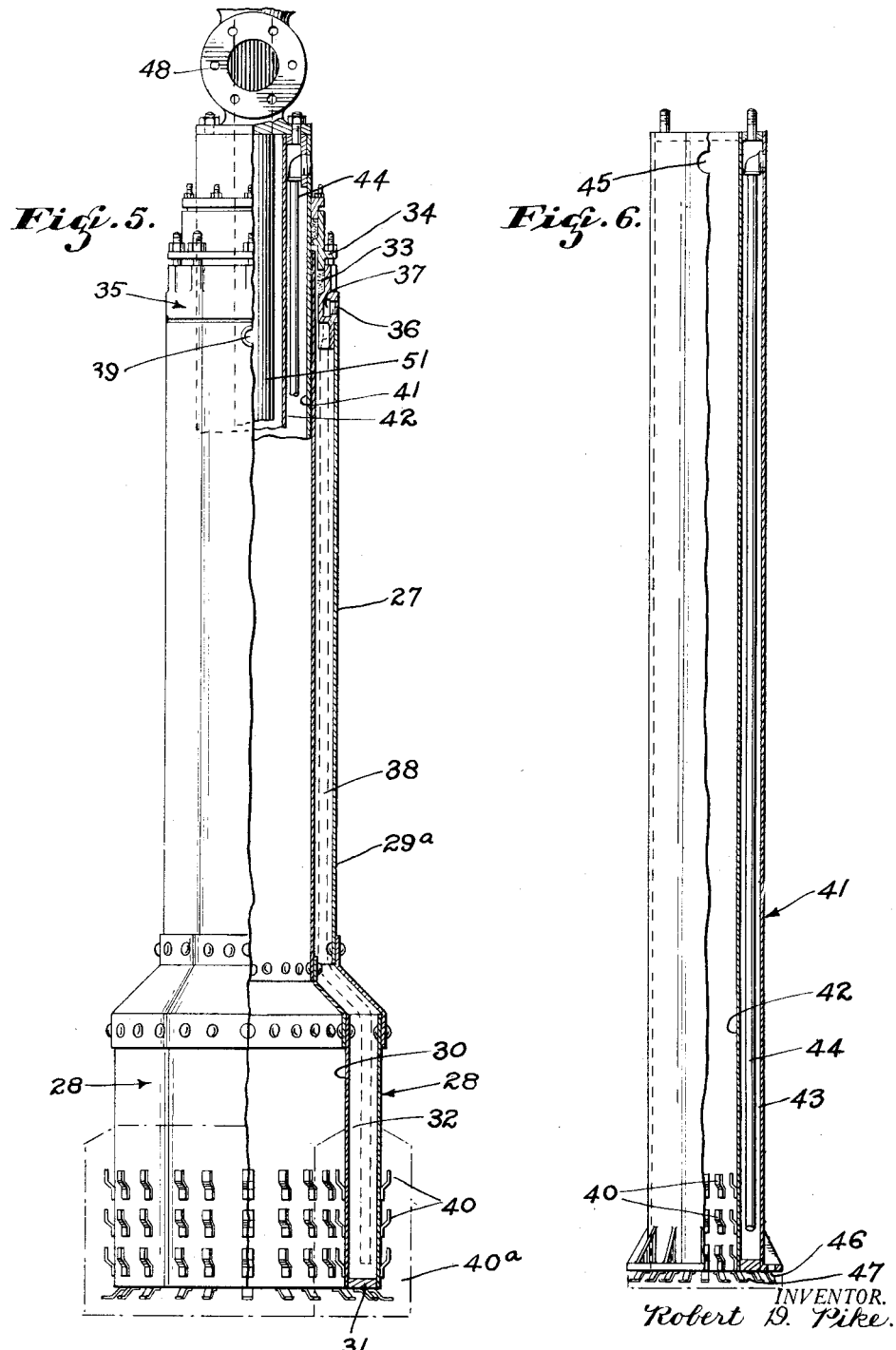

Patented Feb. 11, 1930

1,746,904

UNITED STATES PATENT OFFICE

ROBERT D. PIKE, OF PIEDMONT, CALIFORNIA

METALLURGICAL FURNACE

Application filed September 3, 1927. Serial No. 217,366.

My present invention relates to a new type of fuel fired furnace which is capable of carrying out reactions at a very high temperature without injury to the furnace. These reactions are distinguished from those which are usually carried out in the ordinary blast furnace, by requiring melting of the charge at excessively high temperature rather than strong reducing conditions, although it is possible to carry out reduction to a certain extent in this furnace.

My furnace is adapted for use of oxygen or oxygen-enriched air with liquid or gaseous fuel; or it may be used to advantage in certain cases with ordinary air for combustion. One of its particularly valuable and novel features is that the combustion is confined in a relatively small region in the lower part of the furnace, in the vicinity of the charge, while the latter is in its most reactive state, and that although the temperatures of combustion may attain levels well over 4000 degrees Fahrenheit, no damage results to the lining or other parts of the furnace.

This end is attained by providing means for projecting combustion downwardly in the central lower part of the furnace within a hollow inverted conical cavity whose walls are formed by the charge, and which walls are maintained as the charge is melted away by feeding additional charge material downwardly. The combustion is projected downwardly toward the apex of the cone and upon the melted material. The zone of maximum temperature is, therefore, maintained upon the surface of the molten material and upon the melting material in its immediate vicinity. This promotes the desired reactions at a maximum rate of speed, and maintains the molten products in a maximum state of fluidity. The gases of combustion, together with volatile products of the reaction, turn upwardly from the bottom of the furnace and pass upwardly through the descending charge, thus imparting heat to it.

The base of the hollow inverted cone of the material is formed by a water-cooled bell which extends downwardly into the furnace, and the mixture of fuel with oxygen, or oxygen-enriched air, or with air, is injected downwardly and concentrically through a suitable pipe or pipes within the bell and released into the furnace downwardly and at a considerable velocity at about the level of the base of the hollow inverted cone.

By use of my furnace with commercially pure oxygen or with oxygen-enriched air, I am able to carry out reactions which are only now possible in the electric furnace, and with a considerable increase in financial economy. Also, by utilizing the principle of surface combustion upon the surface of the hollow inverted cone of the charge, with theoretically correct mixtures of gas and air, I am able to effect melting of many materials with the air gas flame more rapidly and more efficiently than is possible in any furnace of known type.

Having described my invention in general terms, I shall now describe a furnace of this type by reference to the drawings. However, I do not wish to be limited by the details of the described furnace, because many of the essential features of my invention may be embodied in furnaces which depart in detail to a considerable extent from the one illustrated.

In the drawing, Figure 1 is a vertical section of the furnace, taken on a plane including the vertical axis of the furnace and the center line of the tapping spout;

Fig. 2 is a horizontal section taken through the furnace on the line 2—2 of Fig. 1, and showing the side wall construction;

Fig. 3 is a view in elevation, showing the upper end and feeding mechanism of the furnace;

Fig. 4 is an enlarged view in vertical section through the furnace wall at the flue opening;

Fig. 5 is a view in half elevation and half vertical longitudinal section, showing the bell and burner assembly;

Fig. 6 is a view in half elevation and half vertical longitudinal section, of one of the pipes of the burner assembly.

Figure 1:
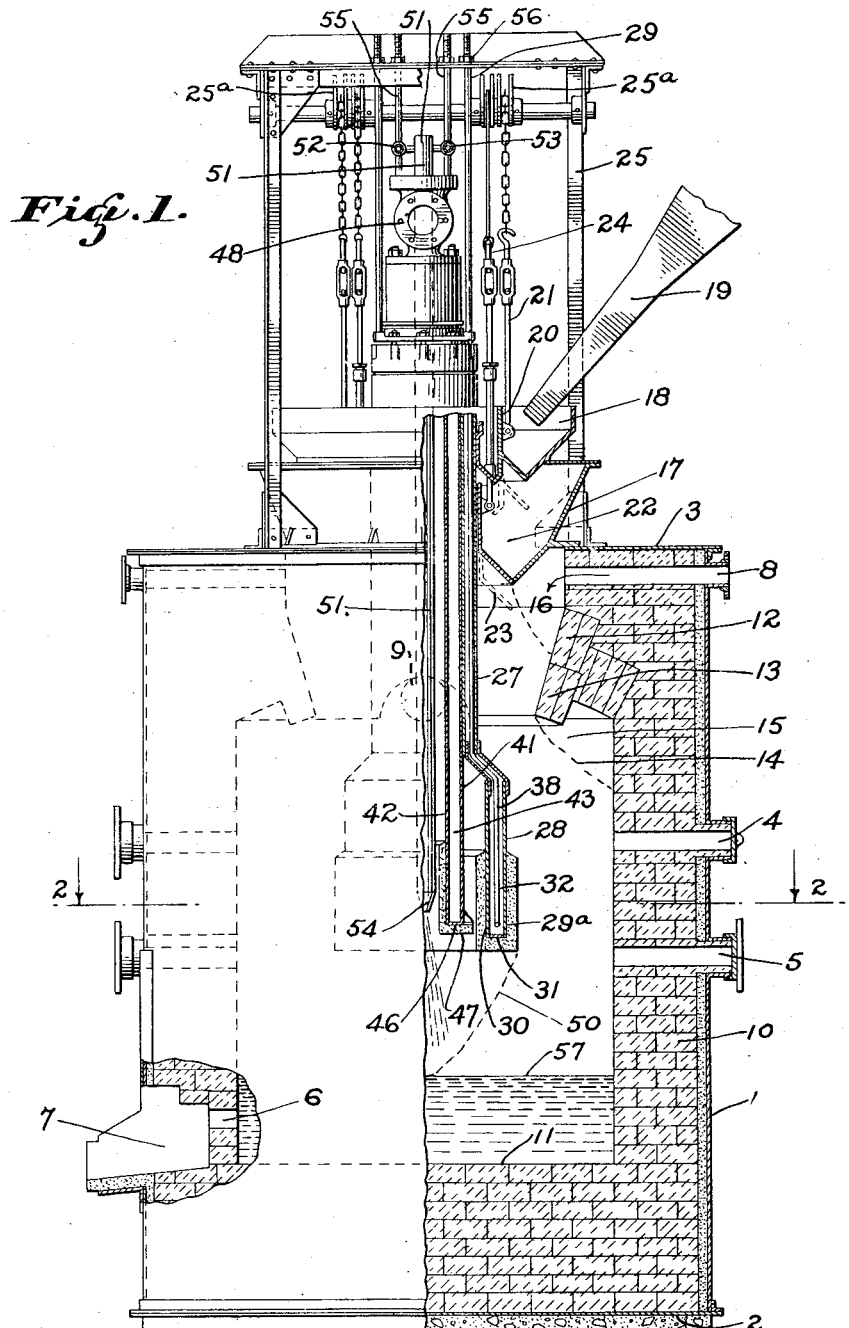

In the drawings, 1 indicates the cylindrical steel plate shell of the furnace, 2 is the steel plate bottom, and 3 is the steel plate top. The shell is provided with suitable poke and sight holes 4 and 5, with tap hole 6, tap spout 7, with holes 8 through which air or other gas may be introduced, if desired, and with outlet 9 for the gases of combustion, and the volatile products of the reaction. The cylindrical shell is lined inside with refractory lining 10, refractory bottom 11, and top 12. Special depending crown brick 13 is provided to make a top slope 14, of the charge which will leave the inside of the port 9 free from obstruction, and establish an annular passage 15 for the circulation of the furnace top gases. If air is introduced through holes 8, it passes into annular space 16, and thence flowing down through the annular column of charge, mingles with the furnace top gases and effects their partial or complete oxidation, thus serving to heat the charge in the furnace at the same time that part of the furnace above the holes 8 is cooled by the air, and any leakage of gas upward is of air, rather than of furnace gases.

The feeding mechanism is made up of casing 17, hopper 18, and feed spout 19, in conjunction with the top bell 20, which is moved up and down by mechanism 21. The bell 20, being in its upper or closed position, the hopper 18 is filled, and the bell 20 is dropped, letting the material fall into the annular space 22. The inner bell 23 is then dropped from its closed position by operation of mechanism 24, and the material drops into the furnace. At this same time, the upper bell 20, being sealed, no gas escapes from the furnace, and likewise, when the upper bell 20 is open, the closure of inner bell 23 prevents escape of gas. Actuating mechanisms 21 and 24, together with actuating levers 25$^a$, are supported by furnace head frame 25. Parts 20 and 23 are provided with central concentric circular holes adapted to having a running fit over the upper and smaller part 27 of the cylindrical bell 28. This bell is suspended in adjustable position in the furnace by rods 29 suspended from frame 25. The bell itself is composed principally of an outer steel shell 29$^a$ and an inner plate 30, which are welded tightly at the bottom with annular ring 31, thus enclosing the annular water-cooled space 32. Closure of the annular space at the top is effected by packing in stuffing-box 33, pressed tightly by gland 34. This latter arrangement is provided to permit differential thermal expansion of shells 29$^a$ and 30, without setting up strain in the metal. The casting 35 is secured to the top of pipe 29$^a$, said casting being provided with water inlet 36 and annular core 37, which communicates to a number of pipes 38, which deliver the cooling water to the bottom of the annular space 32. The water flows upwardly, and discharges through 39. A number of Z-shaped steel slips or retainers 40 are welded onto the outside of plates 29$^a$ and 30, in the lower part of the bell, and onto the annular closing piece 31, and over these is plastered a refractory cement 40$^a$, preferably of carborundum.

The pipe 41 extends concentrically through the bell 28, terminating near the bottom thereof, but capable of vertical adjustment as hereafter described. Inside of 41 is a second concentric pipe 42, which, with annular closure at top and bottom, forms the annular space 43. A number of water-cooling pipes 44 deliver cooling water to the bottom of the annular space 43, and the water flowing upwardly discharges through 45. The bottom of the pipe is provided with a steel face 46, securely attached, and the lower part of the pipe 42 is provided with a number of the retainers 40. Refractory lining 47, preferably of carborundum, is plastered on as illustrated.

The T fitting 48 is attached to top of pipes 41 and 42, and is provided with connection 49 through which air, or oxygen-enriched air, or oxygen, is introduced to pipe 42, and thence downwardly into the furnace within the hollow inverted cone 50.

The pipe 51 may be provided to lead liquid gaseous or pulverized fuel into the furnace, and is illustrated as providing atomized oil, the oil entering through pipe 52, and air for atomizing, through 53. The lower end of the pipe 51 is provided with the atomizing tip 54, which preferably is positioned about three inches above the bottom of the pipe 42. The pipes 41 and 42, with attachments, are suspended by rods 55 from head frame 25, and their position may be adjusted vertically by any suitable means illustrated as nuts 56 on the threaded rods 55. Ordinarily, when the furnace is in full operation the relative position of the pipes 41 and 42 and bell 28 will be as shown in Fig. 1.

The combustion is maintained in the furnace principally within the inverted hollow cone 50, and upon the surface of the charge which form the walls of that cone. The intense heat of the reaction is kept away from the walls of the furnace, so that the temperature of the flame is only limited by the rerequirements of the reaction. It is, therefore, possible to utilize the intense heat of a fuel oxygen flame without damage to the furnace, because the entire action of the flame is expended upon the material itself, and when the gases of combustion come into contact with the furnace walls they are relatively cool. The lower edge of the burner and bell receive the reflection from the interior of the cone, but the area exposed is small, and this area is strongly water-cooled, as well as being protected by a refractory cement. Because the exposed area is very small, the water cooling does not result in serious heat losses.

The gases leaving the zone of maximum temperature within cone 50 pass radially outward through the charge, and then turn upwardly until they pass into annular space 15, and thence out of the furnace through outlet 9. The gases give their heat up to the material, and become rapidly cooled. They will almost invariably contain CO, and this may be burned in whole or in part by air introduced through holes 8, or air may also be introduced for this purpose through poke and sight holes 4 or 5. If the preheating effect, which may be obtained by the burning of CO or other combustible gases in the charge, is to be made use of to the greatest possible extent, the height of the cylindrical part of the furnace above the cone 50 may be increased to any extent practical with a corresponding increase in the length of the upper part of the bell 27, and of the pipes 41 and 42.

The charge on the surface of the hollow inverted cone 50 becomes melted and reacted upon, and the molten slag or product flows into the bottom of the furnace, as shown at 57. Although this furnace is shown with only one tap hole and a comparatively shallow crusible, a deeper crusible may be provided, with tap holes at different levels for tapping slag and metal respectively.

A brief description of the operation of the furnace is as follows:

The furnace is built and assembled as particularly shown in Fig. 1 of the drawings. The bell 28 is adjustably positioned to a desired depth within the furnace, as regulated by the adjusting levers 24, which are moved by the actuating levers 25ᵃ. The circulation of water is established within the bell 28 as the water flows downwardly through opening 36 into an annular distributing duct 37, with which a plurality of water-pipes 38 connect. The water then flows downwardly through the pipes, and then completes a return circulation in an upward direction along the cooling-space 32 between the walls 27 and 30 of the bell. Adjustably positioned within the bell, and extending longitudinally of the reduced portion 27, thereof, is the oxygen delivery pipe 42, which is circumscribed by an outer casing 41. The diameters of the oxygen pipe 42 and outer casing 41 differ to form the water circulating chamber 43. The supply of cooling water is then forced downwardly through the pipes 44 to the bottom of the structure 41, and then continuously flows upwardly and outwardly through outlet pipe 45. It will thus be seen that the bell structure 28 is water-cooled, and that the oxygen delivery pipe 42 is also water-cooled, so that oxygen may be delivered to the smelting zone at a relatively low temperature. Liquid fuel is being delivered to this zone through the pipe 51, and is being projected through the atomizing tip 54 into the combustion space. The atomized oil must first be ignited, but after the smelting and reducing operations have been started, the oil will ignite by spontaneous combustion within the smelting zone. The material to be reduced is then delivered to the upper hopper 18 from spout 19. The actuating members 21 will then be lowered, and this will cause the gates beneath hoppers 18 and 17 to be moved downwardly, thus permitting the charge to pass over a quantity of charge, and the frequency of recharging will cause the mass of metalliferous material to accumulate within the furnace and to bank around the bell 28 in a manner to completely bury the bell and to cause a pocket to form beneath the bell. This pocket will be in the shape of an inverted cone, the side walls of which will be determined by the angle of natural inclination of the material being smelted. The smelting material will pile up into the furnace, forming an annular passageway 15 adjacent the crown brick structure of the furnace, and in which passageway the gases may accumulate and will be drawn therefrom through flue-pipe 9. The oxygen which is being forced downwardly through pipe 41 will pass into the smelting zone 50 in the presence of the burning atomized oil. This will create an intense heat and will at the same time produce a desirable condition of chemical reduction, with the result that the inclined faces of the conical smelting zone 50 will be continuously melted away, and will be continuously replaced by other ore which will feed downwardly by gravity to a point beneath the mouth of the bell 28. The molten material may then be drawn off through the tap hole 6.

I have illustrated a cylindrical furnace with a single burner bell assembly. A large cylindrical or square furnace can be employed, with a plurality of burner bell assemblies depending through the roof of the furnace, or the furnace can be in the form of a trough with a number of burner bell assemblies depending through the roof along the line of the major axis. This latter is the preferable arrangement for large scale furnaces.

Having thus described my invention, what I claim as new and desire to secure by Letters Patent is:

1. A metallurgical furnace for smelting in the presence of oxygen, comprising a furnace body, an artificially cooled member projecting downwardly into said furnace, means for feeding the charge into said furnace body and about said cooled member whereby said member will be buried within the charge except for a conical cavity formed at the lower end thereof as determined by the angle of inclination of the charge, a fuel burner projecting through said water-cooled member and into the cavity formed therebelow, and means for supplying oxygen to said cavity to maintain combustion therein during the smelting operation.

2. A fuel-fired furnace for metallurgical operations characterized by a hollow body having a centrally disposed member about which the furnace charge is adapted to be disposed, said member projecting downwardly into said furnace body into the charge and being adapted to form an inverted conical cavity in the charge immediately therebeneath, and means co-operating with said centrally disposed member for projecting combustible material downwardly into said cavity to thereby create a combustion zone within said cavity.

3. A fuel-fired furnace adapted for employing the intense heat of combustion of fuel with oxygen without damage to the structural materials of the furnace, which comprises a hollow furnace body of refractory material, a member projecting downwardly and centrally within said furnace body, means for feeding a furnace charge downwardly around said centrally disposed member, whereby the charge will form a cavity within itself beneath said centrally disposed member corresponding in shape to an inverted cone, and means for passing combustible fuel and oxygen downwardly through said centrally disposed member into said cavity to maintain combustion of the charge.

4. A metallurgical furnace comprising a hollow furnace body of refractory material, an inverted bell-shaped member projecting downwardly into said furnace body centrally thereof, means at the top of said furnace for feeding the charge downwardly into said furnace and about said inverted bell-shaped member so as to form an inverted conical cavity in the charge immediately beneath said centrally disposed member, the side walls of said cavity being determined by the angle of natural inclination of the charge material, and means for creating and maintaining a combustion of fuel within said conical cavity, whereby the side walls of said conical cavity will be continuously melted away and will be replenished by the downwardly moving charge.

5. A metallurgical furnace comprising a vertically disposed furnace structure, a bell-shaped member suspended centrally within said furnace body adapted to be completely buried beneath the charge, means for feeding the furnace charge downwardly about said inverted bell-shaped member so as to form an inverted conical cavity immediately beneath said centrally disposed member, the upper boundary of said conical cavity being defined by the area of the mouth of said bell-shaped member and the inclined side walls of said cavity being determined by the natural inclination of the material being smelted, cooling means for maintaining said bell-shaped member in a relatively cool condition, and means for delivering combustible fuel to the inverted conical cavity formed as above beneath said bell-shaped member, whereby the combustion of said charge will be carried out centrally within the furnace body and out of contact with the walls thereof.

ROBERT D. PIKE.